US012306111B2

(12) United States Patent
Ritoniemi

(10) Patent No.: US 12,306,111 B2
(45) Date of Patent: May 20, 2025

(54) SMART SYNCHRONIZATION METHOD OF A WEB INSPECTION SYSTEM

(71) Applicant: Procemex Oy, Jyväskylä (FI)

(72) Inventor: Jari Ritoniemi, Lempäälä (FI)

(73) Assignee: Procemex Oy, Jyväskylä (FI)

( * ) Notice: Subject to any disclaimer, the term of this patent is extended or adjusted under 35 U.S.C. 154(b) by 347 days.

(21) Appl. No.: 18/001,984

(22) PCT Filed: Jun. 15, 2021

(86) PCT No.: PCT/FI2021/050449
§ 371 (c)(1),
(2) Date: Dec. 15, 2022

(87) PCT Pub. No.: WO2021/260263
PCT Pub. Date: Dec. 30, 2021

(65) Prior Publication Data

US 2023/0228691 A1 Jul. 20, 2023

(30) Foreign Application Priority Data

Jun. 24, 2020 (FI) ..................................... 20205671

(51) Int. Cl.
*G06T 7/00* (2017.01)
*G01N 21/89* (2006.01)
*G01N 21/892* (2006.01)

(52) U.S. Cl.
CPC ....... *G01N 21/8903* (2013.01); *G01N 21/892* (2013.01); *G06T 7/0004* (2013.01);
(Continued)

(58) Field of Classification Search
CPC ............. G01N 21/8903; G01N 21/892; G01N 2021/8909; G01N 2021/8927;
(Continued)

(56) References Cited

U.S. PATENT DOCUMENTS 5,365,084 A * 11/1994 Cochran ............ G01N 21/8903 348/E7.086
5,870,204 A * 2/1999 Chiu .................. G01N 21/8903 356/430

(Continued)

FOREIGN PATENT DOCUMENTS

CN 201488954 U 5/2010
CN 204287062 U 4/2015

(Continued)

OTHER PUBLICATIONS

International Preliminary Report on Patentability, Finnish Patent and Registration Office, Application No. PCT/FI2021/050449, mailed May 2, 2022, 22 pages.

(Continued)

*Primary Examiner* — Abdullahi Nur
(74) *Attorney, Agent, or Firm* — Ziegler IP Law Group, LLC.

(57) ABSTRACT

A smart synchronizing method of a web inspection system for monitoring a moving web. A synchronizing device, at least one slave camera, and at least one lighting device illuminate an area of the web to be imaged by the cameras. The method includes transmitting a synchronizing signal to the slave camera. The synchronizing signal includes at least a start pulse and serial data including additional information. All the cameras are synchronized with each other based on synchronization moment when integration of cameras end. A light synchronizing signal is transmitted to the at least one lighting device indicating a switching on and off times of the at least one lighting device, which switching off time corresponds to the synchronization moment, and calculating a starting time of integration based on an individual integration time of a camera and the synchronization moment common for cameras of the web inspection system.

10 Claims, 4 Drawing Sheets

(52) U.S. Cl.
CPC ................ *G01N 2021/8909* (2013.01); *G01N 2021/8917* (2013.01); *G01N 2021/8927* (2013.01); *G06T 2207/30124* (2013.01)

(58) Field of Classification Search
CPC ......... G01N 21/93; G06T 7/00; G06T 7/0004; H04N 23/73; H04N 23/74; H04N 23/56; H04N 23/90; H04N 23/662
See application file for complete search history.

(56) References Cited

U.S. PATENT DOCUMENTS

| | | | | |
|---|---|---|---|---|
| 11,310,467 | B2* | 4/2022 | Allen | H04N 23/56 |
| 2002/0109112 | A1* | 8/2002 | Guha | G06T 7/0004<br>250/559.46 |
| 2005/0046694 | A1 | 3/2005 | Quine | |
| 2005/0157176 | A1* | 7/2005 | Silverbrook | H04N 1/00962<br>348/207.99 |
| 2006/0090319 | A1* | 5/2006 | Howe | G01N 21/8903<br>29/709 |
| 2009/0060316 | A1 | 3/2009 | Ruuska | |
| 2010/0231704 | A1 | 9/2010 | Brenneman et al. | |
| 2011/0157389 | A1 | 6/2011 | Mcclellan | |
| 2011/0211747 | A1 | 9/2011 | Floeder et al. | |
| 2016/0142682 | A1 | 5/2016 | Ritoniemi | |
| 2019/0394386 | A1* | 12/2019 | Becker | H04N 23/661 |
| 2021/0041373 | A1* | 2/2021 | Brittain | G06T 3/4038 |

FOREIGN PATENT DOCUMENTS

| | | | |
|---|---|---|---|
| CN | 206114546 | U | 4/2017 |
| CN | 108259702 | A | 7/2018 |
| EP | 3343896 | A1 | 7/2018 |
| JP | 2005210733 | A | 8/2005 |
| JP | 2013516146 | A | 5/2013 |
| WO | 03039156 | A1 | 5/2003 |
| WO | 2004042321 | A1 | 5/2004 |
| WO | 2005106104 | A1 | 11/2005 |
| WO | 2012049370 | A1 | 4/2012 |
| WO | 2020230750 | A1 | 11/2020 |

OTHER PUBLICATIONS

International Search Report, Finnish Patent and Registration Office, Application No. PCT/FI2021/050449, mailed Sep. 13, 2021, 7 pages.

Written Opinion of the International Searching Authority, Finnish Patent and Registration Office, Application No. PCT/FI2021/050449, mailed Sep. 13, 2021, 8 pages.

Japan Patent Office, Notice of Allowance, Application No. 2022-579967, mailed Mar. 4, 2025, 4 pages.

National Intellectual Property Administration, P.R. China, First Office Action, Application No. 202180044952.1, mailed Jan. 3, 2025, 14 pages.

* cited by examiner

SMART SYNCHRONIZATION METHOD OF A WEB INSPECTION SYSTEM

TECHNICAL FIELD

The aspects of the disclosed embodiments relate to a method for synchronizing cameras of a web inspection system monitoring moving web of continuous manufacturing processes.

The aspects of the disclosed embodiments also relate to a web inspection system and a computer program product causing a web inspection system to carry out the method.

BACKGROUND

In continuous manufacturing processes, there are materials or products constantly running through the machine. In such processes, for example, in paper machines, the product must be monitored in order to detect possible deviations, and to obtain a final product of high quality, for example, by web inspection systems such as camera systems comprising a plurality of area scan (array) cameras containing a large matrix of pixels that capture a 2D image of a given area in one exposure cycle with horizontal and vertical elements, for example in 640×480 pixels i.e. with an area scan camera, a matrix of pixels provides an image of the monitored target. As the monitored target moves past the area scan camera system, images of it are exposed by an area image sensor of the camera and transferred to a processing unit for analysis.

If there are more than one camera in the monitoring system, they need to be synchronized so that they always take a picture of the subject at exactly the same time and in such a way that the results and images of the adjacent cameras can be combined when results are processed in the later stage. Due to the camera technology, the switching off of the pulsed lights also needs to be precisely synchronized with the end of the camera integration.

Usually, the cameras are synchronized with each other by a simple synchronizing signal that defines an image capturing time for cameras. This kind of synchronization is adequate provided that a fixed frame rate is used. But, however, when the simple synchronizing signal that only defines an image capturing time for cameras is used, the cameras do not know exactly the image number of the other cameras or the distance that the web has traveled, and therefore, combining the results and adjacent images at a later stage is difficult or almost impossible. Furthermore, if the pulsed light is not switched off exactly at the same time with the end of the camera integration, the integration of pixels will continue, which may lead to a poor quality of image, for example, the image may be too bright.

CN204287062U discloses a synchronizing method of a web inspection system for monitoring a moving web and comprising a master camera synchronizing slave cameras and lighting devices. EP3343896A1 discloses a method and system for synchronizing active illumination pulses in a multi-sensor imager.

SUMMARY

It is an aim of the aspects of the disclosed embodiments to provide and present a novel method for synchronizing cameras and at least one lighting device of a web inspection system monitoring moving web of continuous manufacturing processes. The further aim is to provide a web inspection system and a computer program product causing the web inspection system to carry out the method. The synchronizing method, system, and computer program product according to the aspects of the disclosed embodiments are characterized in what will be presented in the independent claims, and the dependent claims relate to advantageous embodiments of the present disclosure.

According to a first aspect, there is provided a smart synchronizing method of a web inspection system for monitoring a moving web and comprising a synchronizing device and at least one slave camera, and at least one lighting device arranged to illuminate an area of the web arranged to be imaged by the cameras, the method comprising: transmitting a synchronizing signal to the at least one slave camera by the synchronizing device, wherein the synchronizing signal comprises at least a start pulse and serial data comprising additional information for the at least one slave camera, and wherein all the cameras of the web inspection system are configured to be synchronized with each other based on the synchronizing pulse indicating the synchronization moment when integration of cameras end, transmitting a light synchronizing signal to the at least one lighting device by the synchronizing device, wherein a light controlling pulse of the synchronizing signal indicates a switching on and off times of the at least one lighting device, which switching off time corresponds to the synchronization moment, and calculating a starting time of integration based on an individual integration time of a camera and the synchronization moment common for cameras of the web inspection system.

According to an example, the method further comprises starting integration of the cameras at their calculated starting times of integration and switching on the at least one lighting device for illuminating the area on the web imaged by the cameras, and ending integration of all cameras and switching off the at least one lighting device at the time of synchronization moment. According to an example, the method further comprises reading intensity values from pixels of cameras measured during integration and resetting pixels, forming captured image data based on the read intensity values, and transmitting the captured image data with received additional information to an image data processing device. According to an example, the method further comprises forming a combined image from the received image data using the received additional information by the image data processing device. According to an example, all cameras of the web inspection system are area scan cameras. According to an example, the synchronizing device is a smart camera that is one of the cameras of the web inspection system. According to an example, the synchronizing device is an external synchronizing device.

According to a second aspect, there is provided a web inspection system for monitoring a moving web and comprising a synchronizing device and at least one slave camera, at least one lighting device, and an image data processing device, wherein the cameras are synchronized with each other by using the method according to a first aspect and its examples.

According to an example, the at least one slave camera is an area scan camera. According to an example, the cameras of the web inspection system are arranged adjacently as a row. According to an example, the synchronizing device is a smart camera of the web inspection system. According to an example, the synchronizing device is an external synchronizing device. According to an example, the web inspection system further comprises an edge marking device.

According to a third aspect, there is provided a computer program product, stored on a computer readable medium and executable in a computing device, wherein the computer program product comprises instructions for a synchronizing device of a web inspection system comprising at least one slave camera and at least one lighting device to perform the method according to a first aspect and its examples.

BRIEF DESCRIPTION OF THE DRAWINGS

In the following, the aspects of the disclosed embodiments will be described in more detail with reference to the appended drawings, in which.

DETAILED DESCRIPTION

Figure 1A:
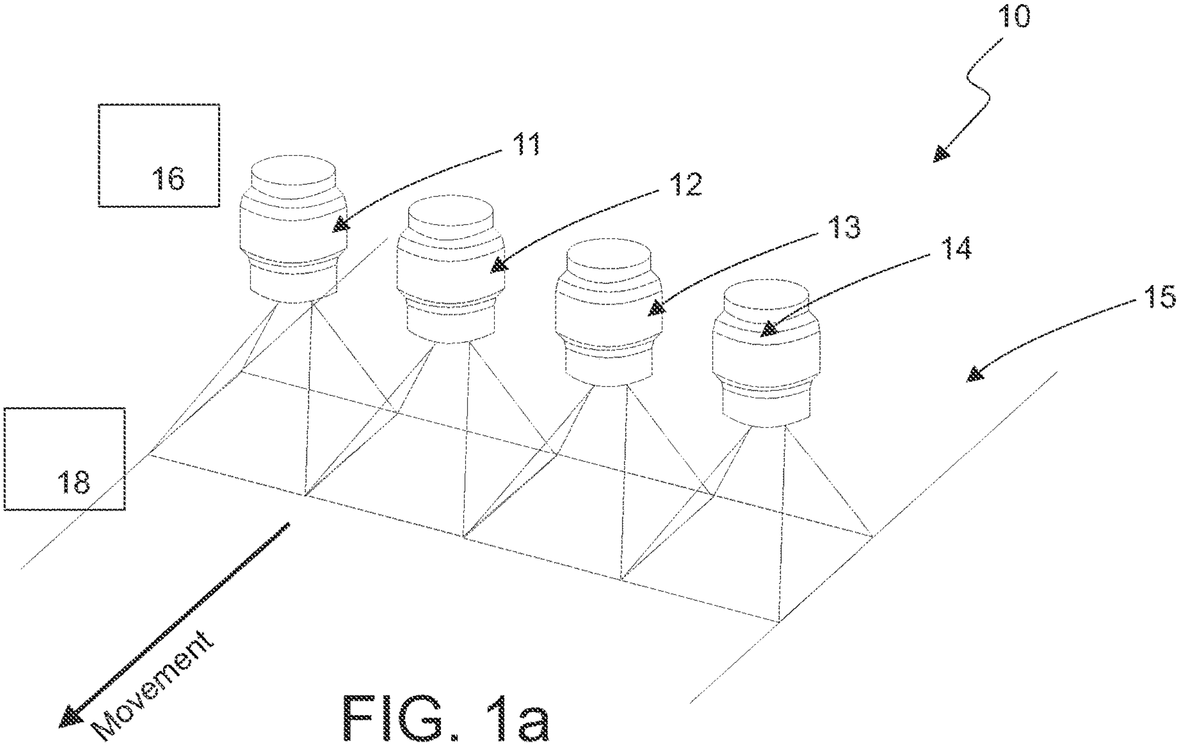
FIG. 1*a* shows a web inspection system comprising a group of adjacent cameras and a lighting device that are synchronized with each other by using the smart synchronization method according to an embodiment of the present disclosure.

Several adjacent image sensors that are area scan cameras also called as matrix cameras of a web inspection system monitor a moving web and each of them is arranged to capture images one image frame, i.e. one image matrix at a time as the web being inspected moves past the field of views of cameras. The captured adjacent images cover substantially the whole width of the web. Each image is captured by exposing a two-dimensional array of photosensitive elements for a brief period, called the integration or shutter time, to light that has been focused on the array by a lens. The array may be called an image and the individual photosensitive elements may be called pixels. Each pixel measures the intensity of light falling on it during integration. After the integration ends, the measured intensity values are read, the pixels are reset i.e. short-circuited to black level until the next integration starts. The measured analogy intensity values are then converted to digital information that is then processed to form the actual captured image. The integration is delimited by the behaviour of the readout electronics and is independent of the exposure made by the shutter. The web to be monitored may be, for example, the web-like material of a paper or cardboard machine, or some other kind of machine comprising moving parts to be monitored, such as a printing machine comprising a moving roll, or an assembly machine.

Image data of each captured image may then be transmitted to an image data processing device for processing. The image data processing device may be, for example, a computer, a logic circuit, a digital signal processor (DSP) or an image data computer or any other computing device suitable for processing images of this type. For processing adjacent images may be combined as a single image with enlarged image field and for this combining, it is important that images of the combined image are captured so that at the time of capturing the web has travelled the same distance in the moving direction in all images so that adjacent images are parallel and aligned to each other and thus form a longitudinal rectangular combined image perpendicular to the moving direction of the web when combined.

Simple synchronizing pulses, provided by a master camera or an external module, may be used for synchronizing adjacent cameras and lighting devices of a web inspection system with each other by indicating a first time point when to start image capturing (start integration of pixels) and when to switch lights on and a second time point when to end image capturing (end integration of pixels) and when to switch lights off. Integration time is dependent on the time interval the lighting devices are switched on. However, this kind of simple start pulse is not adequate in varying situations, for example when there is need to change the capturing frequency (frame rate) on the fly but may work when image capturing frequency of cameras are predetermined and remain the same. Furthermore, when this kind of simple synchronizing pulse is used, cameras do not add in connection with captured images information relating, for example, to the image sequence number and/or to the distance that the web has travelled in the moving direction at the time of image capturing and nor is such information otherwise available, although such information is needed when images are combined. Therefore, these images are very hard or at least sometimes even impossible to be combined as a single combined image. Furthermore, it is also possible that captured images are not substantially parallel and if an event is comprised at least by one of the images and a defect map is formed based on these non-parallel images, the defect map cannot be reliably used for locating and/or correcting the defect in the web.

Therefore, in the present disclosure a smart synchronizing method is used for synchronizing a web inspection system having more than one adjacent camera instead of simple synchronizing pulse. In the smart synchronizing method a master camera, that may be one of the cameras of the web inspection system, is used for synchronizing other cameras of the web inspection system that are so called slave cameras and at least one lighting device or an external synchronization device may be used for synchronizing cameras of the web inspection system and at least one lighting device. If the external synchronization device is used for synchronizing, all the cameras are slave cameras. Whether the device transmitting the synchronizing signal is either a master camera or an external device, it may be called aa a synchronizing device.

The master camera synchronizes the slave cameras by transmitting them a synchronizing signal. And in a case of the external synchronization device, it is the external synchronization device that transmit the synchronizing signal to cameras of the web inspection system. The synchronizing signal indicates a synchronizing moment for cameras. The synchronizing moment corresponds a switching off time of lights of at least one lighting device. The cameras define starting of their integration so that it ends simultaneously with the transmitted switching off time of lights and because integration of all cameras ends at the same time and also lights are switched off at the same time, adjacent images are taken of the web at the same time i.e. simultaneously. Further, the synchronizing signal may comprise serial data field comprising additional information transmitted that may be used when combining of images of adjacent cameras or controlling camera settings. This additional information easies the combination of these images and thus they can be reliably combined with each other for processing stage, for example, for analyzing, and/or for forming a defect map. In the smart synchronizing method, for synchronizing the at least one lighting device of the web inspection system with cameras the synchronizing device transmits a light synchronizing signal to the at least one lighting device. A light controlling pulse of the light synchronizing signal indicates a switching on and off times of at least one lighting device. The smart synchronization method comprises transmitting both signals, the synchronizing signal to the at least two cameras and a light synchronizing signal to the at least one lighting device.

The web inspection system may further comprise an edge marking device. The smart camera or the external synchronization unit may be used for controlling the edge marking device. The edge marking device sprays a marking in the edge are of the paper web. The marking may be, for example, so called moving direction (MD)-marking, which is sprayed onto the web at certain intervals. The interval may be, for example, 25 m, 100 m or 1000 m or any other predetermined distance. And based on the marking, a defect is easier to be located for correction. The marking may be visible or invisible for eyes, but visible for UV-light, it may be dot or line code, for example, a certain type of binary code.

FIG. 1*a* shows a web inspection system 10 comprising a group of cameras 11, 12, 13, 14 and a lighting device 16 that are synchronized with each other by using a smart synchronization method according to an embodiment of the present disclosure. The smart synchronization method comprises transmitting of a synchronizing signal and a light synchronizing signal. The web inspection system 10 comprises 4 adjacent cameras 11, 12, 13, 14. The lighting device 16 is configured to illuminate field of views of the cameras 11, 12, 13, 14 on an inspected web 15. All cameras 11, 12, 13, 14 are area scan cameras that see different parts of the web. One of the cameras, the camera 11 in this embodiment, is a master camera and the other cameras 12, 13, 14 are slave cameras. Each camera 11, 12, 13, 14 has its own integration time that it predetermined for it or which it has automatically controlled/adjusted based on intensity of its previously captured image(s). The intensity may change, for example, because of dirt on the lens or change of a monitoring target etc.

The master camera 11 synchronizes the slave cameras 12, 13, 14 by transmitting a synchronizing signal to them. The synchronizing signal comprises a start pulse. The synchronizing signal indicates for the cameras 12, 13, 14 the time that is the synchronization moment at which the integration should be ended for capturing images 11', 12', 13', 14' shown in FIG. 1*b*. The synchronization moment may be, for example, a trailing edge or rising edge of the start pulse. And based on this ending time of integration and own integration time slave cameras 12, 13, 14 and the master camera 11 itself calculate their own starting times for integration.

The master camera 11 further synchronizes the lighting device 16 by a light synchronizing signal indicating a switching on and off times for the lighting device 16 by a light controlling pulse. The switching on time is indicated in this embodiment by a rising edge of light controlling pulse. The lighting device 16 is switched on before integration of any of the cameras 11, 12, 13, 14 starts. The switching off time is indicated in this embodiment by a trailing edge of the light controlling pulse and it defines the time when to switch off the lighting device 16 and corresponds the synchronizing moment of the cameras 11, 12, 13, 14. If there are more than one lighting devices, the master camera 11 synchronizes them all by the light synchronizing signals so that they all will be switched off at the defined synchronization moment.

The web inspection system 10 also comprises an edge marking device 18 for marking the edges of the web 15 at certain predetermined intervals, but the edge marking device 18 is an optional device in the web inspection system 10.

The transmitted synchronizing signal also comprises serial data. The serial data field may comprise additional information for slave cameras 12, 13, 14. This additional information can be used for combining images or it may be some other kind of information, for example, for controlling camera settings. The smart synchronization signal and the light synchronizing signal are explained more precisely in context with FIG. 2.

It is however possible, that there are embodiments wherein instead of area scan cameras, line cameras are used. In addition, it is also possible, that all cameras 11, 12, 13, 14 are so called slave cameras and an external synchronization unit is used for transmitting the synchronizing signal to them and the light synchronizing signal to the lighting device 16.

Figure 1B:
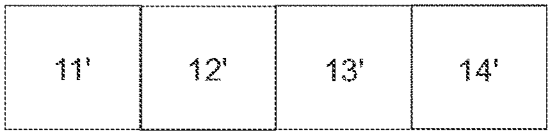
FIGS. 1*b-e* show images captured by cameras of the web inspection system of FIG. 1*a* and combined images of these images.

FIG. 1*b* shows the images 11', 12', 13', 14' captured by the cameras 11, 12, 13, 14 of the web inspection system 10 of FIG. 1*a* correspondingly. The capturing of images 11', 12', 13', 14' was synchronized by the smart synchronization signal as explained above and therefore the images 11', 12', 13', 14' are parallel and taken at the same distance from the beginning of the web 15 in the moving direction. As can be seen, there is no defect or corresponding in any of the images 11', 12', 13', 14'.

Figure 1C:
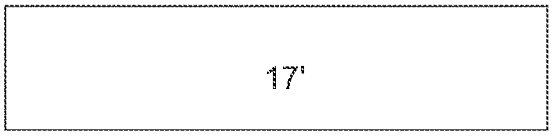

FIG. 1*c* shows a combined image 17' formed from the images 11', 12', 13', 14' of FIG. 1*b*. And because the images 11', 12', 13', 14' were parallel and aligned, all their information is included in the combined image 17'. The images 11', 12', 13', 14' are successfully combined based on the location information sent by the synchronization signal.

Figure 1D:
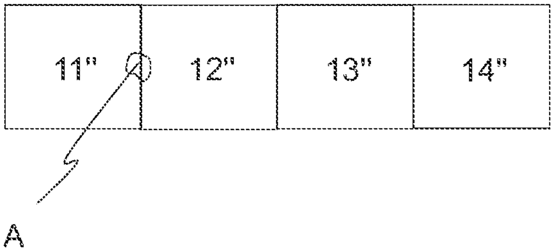

FIG. 1*d* shows the images 11", 12", 13", 14" captured by the cameras 11, 12, 13, 14 of the web inspection system 10 of FIG. 1*a* correspondingly. Capturing of the images 11", 12", 13", 14" were again synchronized by using the smart synchronization signal as explained above in context with FIG. 1*a* and therefore the images 11", 12", 13", 14" are again parallel and aligned transversely to the moving direction of the web 15. As can be seen, there is a defect A in the border area of the images 11" and 12". The defect A is located so that a first part of the defect A is in the image 11" and the second part is in the image 12". The defect A is thus a single error distributed over the area of the two adjacent images 11", 12".

Figure 1E:
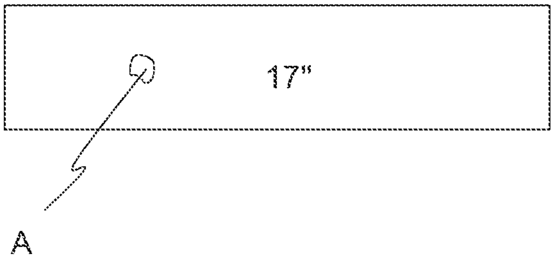

FIG. 1*e* shows a combined image 17" formed from the images 11", 12", 13", 14" of FIG. 1*d*. And because the images 11", 12", 13", 14" were parallel and aligned, all their information is included in the combined image 17" correctly and the defect A is shown in a correct place and correctly i.e. as a single defect.

Figure 1F:
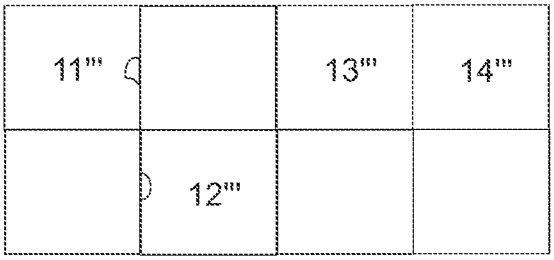
FIGS. 1*f-g* show images captured by cameras of a web inspection system comprising adjacent cameras but not using the synchronization method according to an embodiment of the present disclosure.
Figure 1G:
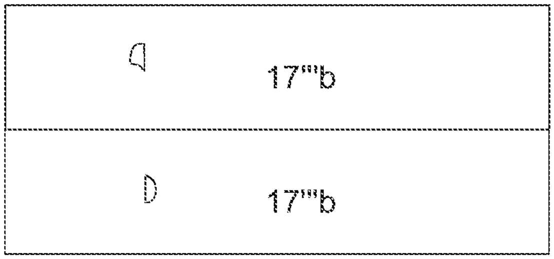

FIG. 1*f* shows the images 11'", 12'", 13'", 14'" of the cameras 11, 12, 13, 14 of the web inspection system 10 of FIG. 1*a* correspondingly. But these images 11'", 12'", 13'", 14'" are not captured by using the smart synchronization method and its synchronization signal, but using a simple synchronization signal. The image capturing frequencies of cameras 11, 12, 13, 14 are also varying i.e. do not remain the same and as predetermined for the cameras 11, 12, 13, 14. Therefore the adjacent images 11'", 12'", 13'", 14'" are yet captured simultaneously, at the same time, but because the simple synchronization signal did not send location information or other information suitable to be used in combining phase for the cameras 11, 12, 13, 14, the images 11''', 12''', 13''', 14''' are mixed and one of the images 12''' has been misplaced at the combining phase and it has ended up in a different combined image than the other images 11''', 13''', 14''', as shown in FIG. 1*g*. The other images 11''', 13''', 14''' are in the combined image 17'''*a* and the misplaced image 12''' is in the combined image 17'''*b*. Cameras 11, 12 imaged the same defect A as in FIG. 1*d*, but now the first part and second part of the defect A are in two different combined images 17'''*a* and 17'''*b*. And if a defect map is formed based on these combined images 17'''*a* and 17'''*b* and the defect A of the web 15 is tried to be corrected based on the defect map, the correction will not succeed, because the defect A is not indicated correctly in that defect map. Whereas, if a defect map is formed based on the image 1*e* and the defect A is tried to be corrected based on that defect map, the correction will succeed, because the defect A is indicated correctly and in a correct place in that defect map.

Figure 2:
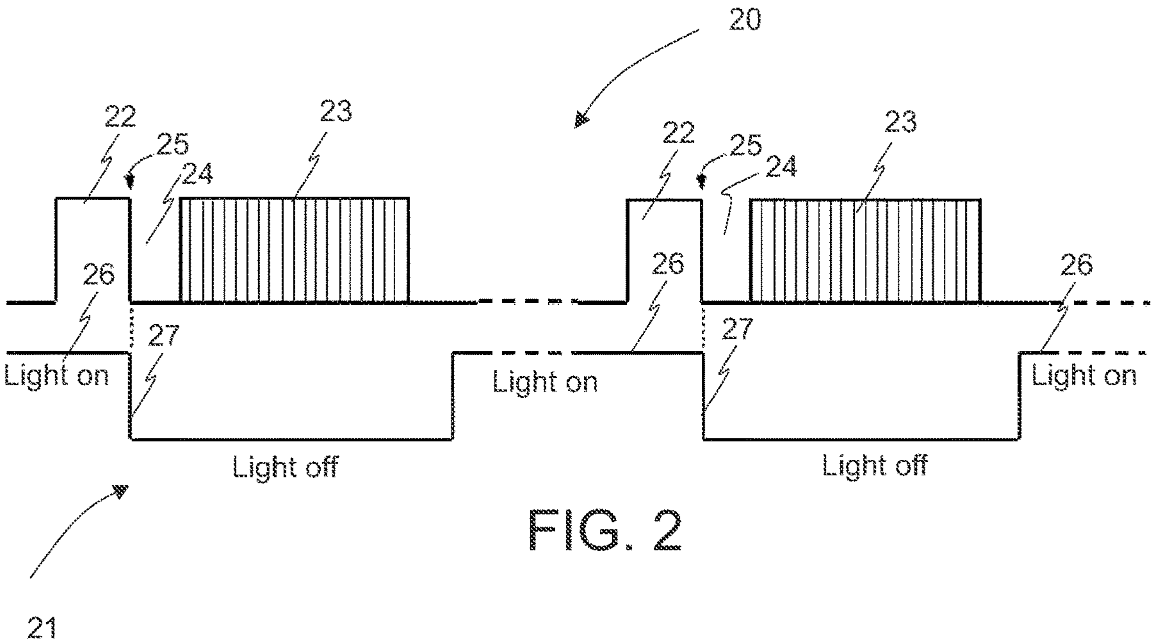
FIG. 2 shows smart synchronization signals of a smart synchronization method of a web inspection system according to an embodiment of the present disclosure.

FIG. 2 shows synchronization signals of a smart synchronization method of a web inspection system according to an embodiment of the present disclosure. The synchronization signal shown above is the synchronization signal 20 transmitted by a synchronizing device, for example a master camera to slave cameras. The purpose of the synchronization signal 20 is to synchronize all the cameras with each other to capture images simultaneously so that integration of images ends at the same time and also to provide additional information to be added with the images.

The synchronization signal 20 comprises a start pulse 22, serial data 23 and a pause 24 between them. The synchronization moment 25, when all cameras end integration and lights are switched off, is the trailing edge i.e. falling edge of the start pulse 22 i.e. the start pulse 22 contains information indicating the synchronization moment 25 for the slave cameras. But it may also be a front edge i.e. rising edge of the start pulse 22 that indicates the synchronization moment 25 instead of the trailing edge. The cameras calculate their own starting time of integration i.e. a time point where they start integration based on own integration time from the synchronization moment 25, common for all cameras. The length of the start pulse 22 may be, for example 30-80 μs, for example, 50 μs. For example, if the start pulse 22 indicates that the synchronization moment 25 is after 50 μs (i.e. the length of the pulse 22 is 50 μs, and an integration time of a first camera is 20 μs, the first camera starts the integration after 30 μs from starting of the start pulse 22 i.e. 20 μs before the synchronization moment 25 and an integration time of a second camera is 15 μs, the second camera starts the integration after 35 μs from starting of the start pulse 22 i.e. 15 μs before the synchronization moment 25.

After the end of the start pulse 22 and before the serial data 23 there is the pause 24. The length of the pause 24 may be few μs, for example 2-10 μs. The serial data 23 comprises additional information for the slave cameras. The information may be, for example, the exact end time of the next light pulse i.e. the next synchronization moment, a lighting profile number arranged to be used when capturing a next image, a position information at the time of the next synchronization moment 25, an image number for the next image, a skip the next image flag, some application-specific data, checksum, etc. A suitable bit rate for a data field of serial data 23 may be, for example, around 1 Mbit/s. Cameras may add this additional information with captured image data when it is transmitted for an image data processing device and/or the cameras may use this additional information to control their own settings or operations.

The signal shown below the smart synchronization signal 20 is a light synchronization signal 21 transmitted to lighting devices of the web inspection system arranged to illuminate the imaged area of the web also by the master camera. The light synchronization signal 21 indicates switching on and off times of lights of the lighting devices by light controlling pulses 26. The trailing edge of the light controlling pulse 26 indicates for the lighting devices a time point when to be switched off and this time corresponds the synchronization moment 25 of the smart synchronization signal 20. Thus lighting devices are switched simultaneously with the time point when cameras end integration. The rising edge of the light controlling pulse 26 indicates for the lighting devices a time point when to switch on and this time is before any of the cameras is configured to start integration. Or alternatively the trailing edge of the light controlling pulse 26 indicates for the lighting devices the time point when to be switched on and the rising edge of the light controlling pulse 26 indicates for the lighting devices the time point when to switch off.

Figure 3:
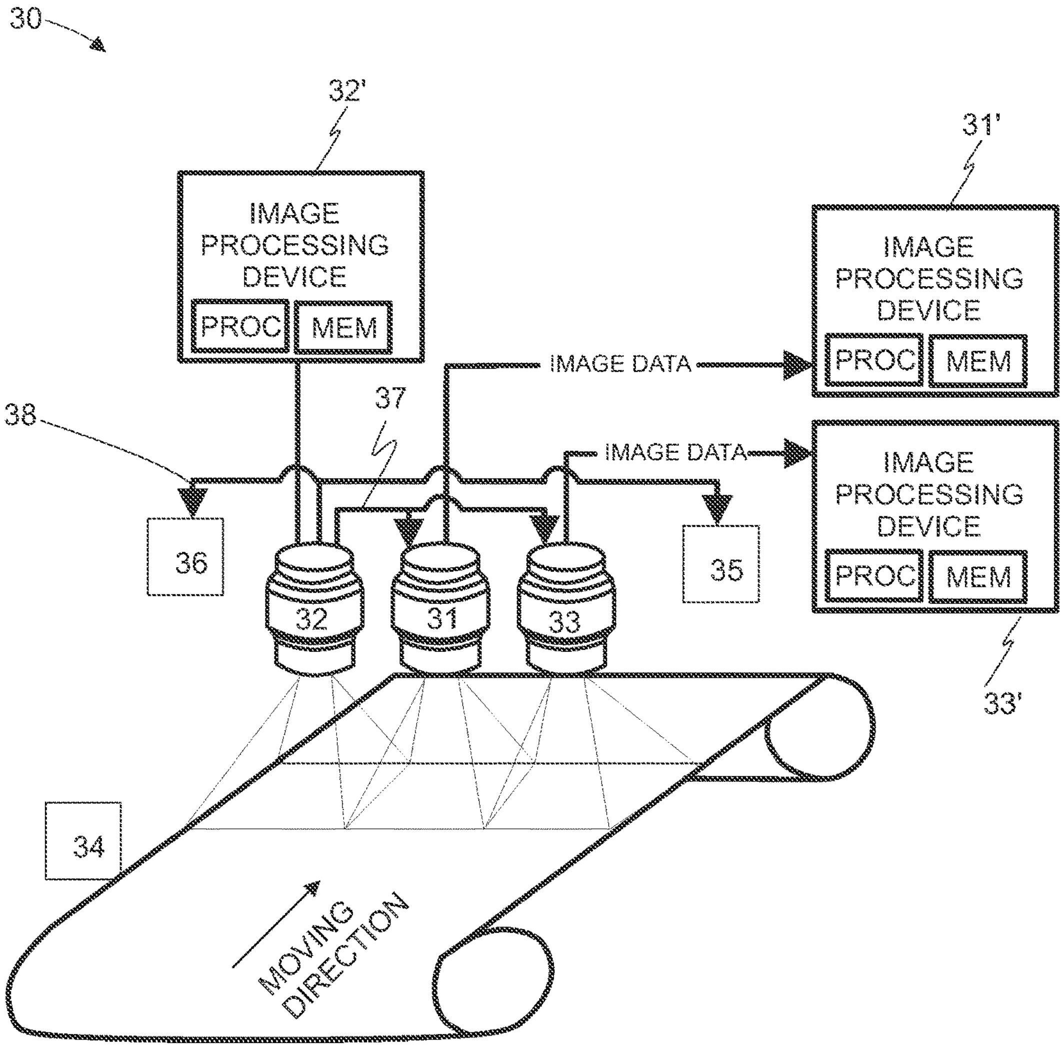
FIG. 3 shows a web inspection system using a smart synchronization method according to an embodiment of the present disclosure for synchronizing its cameras and lighting devices.

FIG. 3 shows a web inspection system 30 using a smart synchronization method according to an embodiment of the present disclosure for synchronizing its cameras 31, 32, 33 and lighting devices 35, 36. The web inspection system 30 comprises a group of three cameras 31, 32, 33, two lighting devices 35, 36 and an image data processing device 31', 32', 33' for each camera 31, 32, 33. It is however possible that an image data processing device is common for one or more cameras. The cameras 31, 32, 33 are arranged, adjacently i.e. side by side as a row to expose image frames i.e. capture image matrixes from a web across its entire width so that adjacent images together cover an area corresponding the entire width of the web. One of the cameras 32 is a master camera configured to act as a synchronizing device and the rest of the cameras are slave cameras 31, 33.

The lighting devices 35, 36 are arranged to illuminate the area on the web arranged to be imaged by the cameras 31, 32, 33. Switching off and on of the lighting devices 35, 36 is controlled by a light synchronization signal 38 transmitted by the master camera 32. The light synchronization signal 38 is explained in context with FIG. 2.

Cameras 31, 32, 33 are arranged to capture images at a synchronizing moment indicated by a single common smart synchronization signal 37. At the same synchronizing moment, the lighting devices 35, 36 are switched off. The master camera 32 transmits the smart synchronization signal 37 to the slave cameras 31, 33. The smart synchronization signal 37 also comprises serial data comprising additional information for slave cameras 31, 33. The type of additional information is explained more precisely in context with FIG. 2. Cameras 31, 32, 33 may use the received additional information for adjusting their settings for next image capturing. For example, they may receive a lighting profile number arranged to be used when capturing a next image as additional information and they may adjust their parameters based on that information. Their parameters may be predefined for each lighting profile number. Furthermore, after capturing of images, cameras 31, 32, 33 may add the received additional information in context with the captured image data. For example, if they have received a time of a synchronization moment, a number of the next image, and/or a position in a moving direction at the time of the synchronization moment as additional information, they may add this information to captured image data. After this, the cameras 31, 32, 33 are arranged to transfer captured image data with additional information to their image data processing devices 31', 32', 33' for processing, analysis etc.

The image data processing devices 31', 32', 33' may be an external device. An image data processing device 31', 32', 33' comprises at least one processor, at least one memory including computer program code for one or more program units and means for receiving image data and additional data wirelessly or via wired connection, for example, a receiver for receiving data wirelessly or via a wired connection. There may be multiple processors e.g. a general purpose processor and a graphics processor and a DSP processor, a Field-programmable gate array (FPGA) and/or multiple different memories e.g. volatile memory for storing data and programs at run-time and nonvolatile memory like a hard disk for permanently storing data and programs. The image data processing device 31', 32', 33' may be any computing device suitable for handling image data such as a computer. The image data processing devices 31', 32', 33' may be in electronic communication with the cameras 31, 32, 33 via signal lines, correspondingly. For handling the signals to/from the signal lines, the image data processing device 32 comprises I/O circuitry. The connection between the cameras 31, 32, 33 and the image data processing devices 31', 32', 33' may be a wired or wireless network. The image data processing devices 31', 32', 33' may also include a video controller and an audio controller for generating signals that can be produced to the user with computer accessories. The simulator may produce output to the user through output means. The video controller may be connected to a display. The display may be e.g. a flat panel display or a projector for producing a larger image. The audio controller may be connected to a sound source such as loudspeakers or earphones.

One of the image data processing devices 31', 32', 33' may combine adjacent images as a combined image based on additional information received in context with captured image data. The image data processing device 31', 32', 33' may also analyse the combined image in order to detect defects or other events. Further, one of the image data processing devices 31', 32', 33' or an external computing device may form a defect map, based on captured and combined images, indicating location of the defects in the web with respect to the distance travelled by the web so that correcting of those defects is easier because distances of defects from the beginning of the web can be accurately shown. The defect map may be stored in a database and displayed.

The image data processing devices 31', 32', 33' may also be a part of the cameras 31, 32, 33.

Cameras 31, 32, 33 form a first camera row, if there are more than one camera rows i.e. at least one other camera row comprising at least one slave camera, the same master camera 32 can be used for transmitting smart synchronization signals for those slave cameras or each row may comprise its own master camera that can be used for transmitting smart synchronization signals for slave cameras of its own camera row. The first camera row may also comprise more than shown three cameras 31, 32, 33 as well as other possible camera rows. The number of cameras in one row may depend on the width of the web and/or field of views of used cameras.

The web inspection system 30 also comprises an edge marking device 34 for marking the edges of the web at certain predetermined intervals, but the edge marking device 34 is again an optional device in the web inspection system 30.

Figure 4:
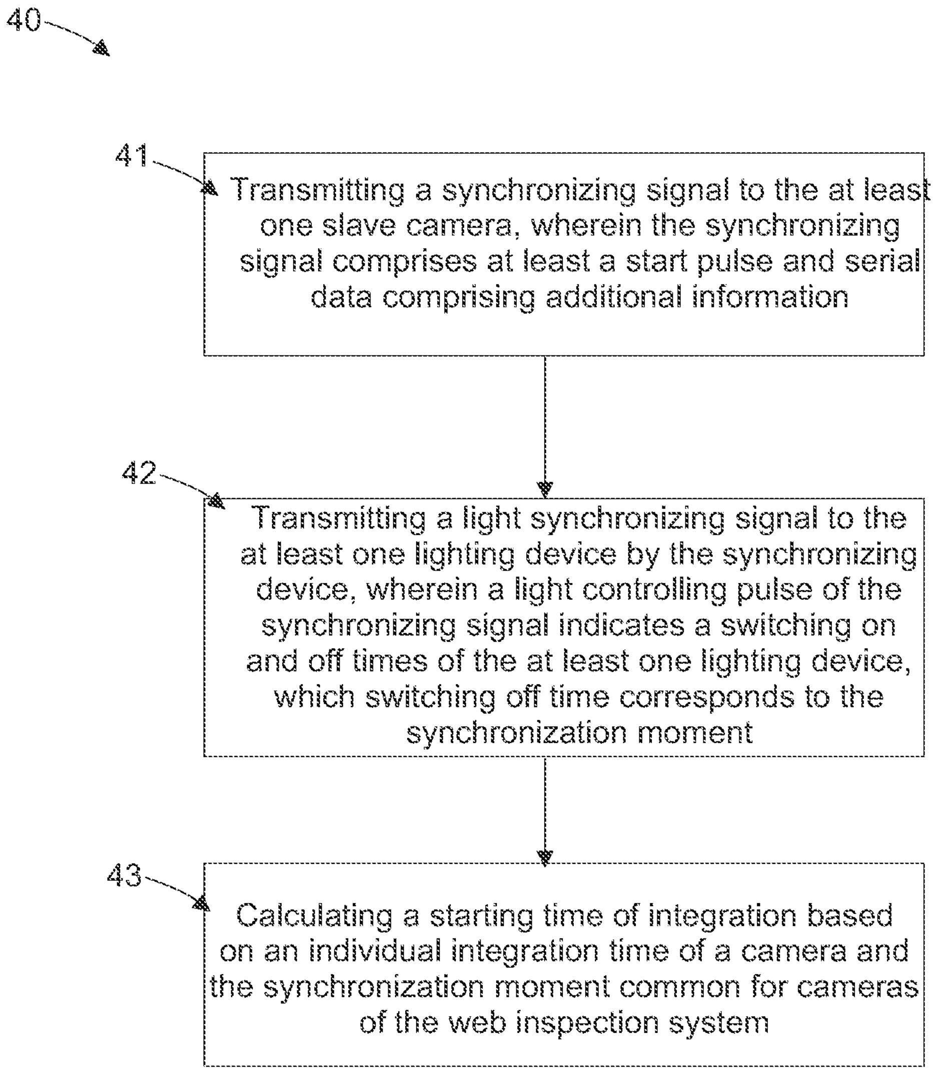
FIG. 4 shows a block diagram of a smart synchronization method of a web inspection system according to an embodiment of the present disclosure.

FIG. 4 shows an embodiment of the present disclosure, in which a block diagram of a synchronization method 40 of a web inspection system is disclosed. The web inspection system is configured to monitor a moving web and comprise a synchronizing device and at least one slave camera, and at least one lighting device arranged to illuminate an area of the web arranged to be imaged by the cameras. In step 41 a synchronizing signal is transmitted to the at least one slave camera by the synchronizing device, wherein the synchronizing signal comprises at least a start pulse and serial data comprising additional information for the at least one slave camera, and wherein all the cameras of the web inspection system are configured to be synchronized with each other based on the synchronizing pulse indicating the synchronization moment when integration of cameras end. In step 42 a light synchronizing signal is transmitted to the at least one lighting device by the synchronizing device, wherein a light controlling pulse of the synchronizing signal indicates a switching on and off times of the at least one lighting device, which switching off time corresponds to the synchronization moment. And in step 43, a starting time of integration is calculated based on an individual integration time of a camera and the synchronization moment common for cameras of the web inspection system.

The various embodiments of the present disclosure can be implemented with the help of computer program code that resides in a memory and causes an apparatus to carry out the present disclosure. For example, the apparatus that is a computing device, for example, an image data processing device may comprise circuitry and electronics for analysing, receiving and transmitting data, a computer program code in a memory, and a processor which, when running the computer program code, causes the apparatus to carry out the features of an embodiment. The processor, when running the computer program code may cause a web inspection system comprising a synchronizing device and at least one slave camera, and at least one lighting device arranged to illuminate an area of the web arranged to be imaged by the cameras to carry out all the steps of the following method: transmitting a synchronizing signal to the at least one slave camera by the synchronizing device, wherein the synchronizing signal comprises at least a start pulse and serial data comprising additional information for the at least one slave camera, and wherein all the cameras of the web inspection system are configured to be synchronized with each other based on the synchronizing pulse indicating the synchronization moment when integration of cameras end, transmitting a light synchronizing signal to the at least one lighting device by the synchronizing device, wherein a light controlling pulse of the synchronizing signal indicates a switching on and off times of the at least one lighting device, which switching off time corresponds to the synchronization moment, and calculating a starting time of integration based on an individual integration time of a camera and the synchronization moment common for cameras of the web inspection system.

Considerable advantages are achieved by the present disclosure when compared to methods and systems of existing web inspection systems comprising at least two area scan cameras. By means of the arrangement according to the present disclosure it is possible to synchronize area scan cameras by a smart synchronizing method, wherein a smart synchronizing signal is transmitted by a master camera that is one of the cameras of the web inspection system to other cameras, slave cameras, of the web inspection system. In addition, by means of the smart synchronizing signal according to the present disclosure it is also possible to transmit additional information to slave cameras and utilize the additional information not only for image capturing but also when analysing the captured image data. In the smart synchronizing method also lighting device(s) of the web inspection system can be controlled by light synchronization signal(s) for enabling best possible imaging result.

It is obvious that the present disclosure is not limited solely to the above-presented embodiments, but it can be modified within the scope of the appended claims.

The invention claimed is:

1. A smart synchronizing method of a web inspection system for monitoring a moving web and comprising a master camera configured to act as a synchronizing device and at least one slave camera, and at least one lighting device arranged to illuminate an area of the web arranged to be imaged, the method comprising:

transmitting a synchronizing signal to the at least one slave camera by the synchronizing device, wherein the synchronizing signal comprises at least a start pulse and serial data comprising additional information for the at least one slave camera, which additional information is configured to be used for combining of images of adjacent cameras, and wherein all the cameras of the web inspection system are configured to be synchronized with each other based on the start pulse indicating a synchronization moment when integration of the cameras ends, transmitting a light synchronizing signal to the at least one lighting device by the synchronizing device, wherein a light controlling pulse of the light synchronizing signal indicates switching on and off times of the at least one lighting device, which switching off time corresponds to the synchronization moment, and calculating a starting time of integration based on an individual integration time of a camera and the synchronization moment common for the cameras of the web inspection system.

2. The smart synchronizing method according to claim 1, wherein the method further comprises:

starting integration of the cameras at their calculated starting times of integration and switching on the at least one lighting device for illuminating the area on the web imaged by the cameras, and ending integration of all the cameras and switching off the at least one lighting device at the time of the synchronization moment.

3. The smart synchronizing method according to claim 2, wherein the method further comprises:

reading intensity values from pixels of the cameras measured during integration and resetting pixels, forming captured image data based on the read intensity values, and transmitting the captured image data with the received additional information to an image data processing device.

4. The smart synchronizing method according to claim 3, wherein the method further comprises:

forming a combined image from the received image data using the received additional information by the image data processing device.

5. The smart synchronizing method according to claim 1, wherein all the cameras of the web inspection system are area scan cameras.

6. A web inspection system for monitoring a moving web and comprising a master camera as a synchronizing device and at least one slave camera, at least one lighting device, and an image data processing device, wherein the cameras are synchronized with each other by using the method of claim 1.

7. A web inspection system according to claim 6, wherein the at least one slave camera is an area scan camera.

8. A web inspection system according to claim 6, wherein the cameras of the web inspection system are arranged adjacently as a row.

9. A web inspection system according to claim 6, wherein the web inspection system further comprises an edge marking device.

10. A computer program product, stored on a computer readable medium and executable in a computing device, wherein the computer program product comprises instructions for a master camera acting as a synchronizing device of a web inspection system comprising at least one slave camera and at least one lighting device to perform the method of claim 1.

* * * * *